United States Patent [19]

Katsumura

[11] Patent Number: 5,081,481
[45] Date of Patent: Jan. 14, 1992

[54] CAMERA WITH A SHUTTER

[75] Inventor: Nobuo Katsumura, Hachioji, Japan

[73] Assignee: Konica Corporation, Tokyo, Japan

[21] Appl. No.: 494,625

[22] Filed: Mar. 16, 1990

[30] Foreign Application Priority Data

Mar. 17, 1989 [JP] Japan ................................. 1-66787

[51] Int. Cl.⁵ .............................................. G03B 9/08
[52] U.S. Cl. ............................................... 354/234.1
[58] Field of Search ................... 354/230, 234.1, 235.1, 354/252, 250, 268

[56] References Cited

U.S. PATENT DOCUMENTS

4,505,568 3/1985 Asano et al. ................... 354/234.1 X

Primary Examiner—A. A. Mathews
Attorney, Agent, or Firm—Finnegan, Henderson, Farabow, Garrett, and Dunner

[57] ABSTRACT

A camera, comprising; a shutter for controlling a light amount from outside of camera to a photosensitive material therein; a first driver for actuating shutter, in which a driving movement moves between first position and second position so that the shutter is driven; a restriction for obstructing the movement of the driving movement, in which the restriction moves between the first location where the restriction restricts the movement of the driving movement on the way of the movement and the second location where the restriction allows the whole movement of the driving movement; and a second driver for actuating the restriction, in which the restriction is disposed so that the second driver moves in a direction orthogonal to the moving direction of the driving movement.

1 Claim, 5 Drawing Sheets

CAMERA WITH A SHUTTER

BACKGROUND OF THE INVENTION

This invention relates to a camera with a shutter the blades of which are actuated by electromagnetic force.

Many kinds of shutters which are actuated by electromagnetic force have been proposed. This type of shutter not only has a simple mechanism but also makes the whole mechanism of a camera simpler because a shutter charge operation is not necessary, whereas the conventional shutter is charged by the force generated by another mechanism such as the film winding mechanism and the like.

For that reason, there is a general tendency that the electromagnetic actuated shutter is widely applied to a popular camera as well as a high-grade camera.

Figure 5:
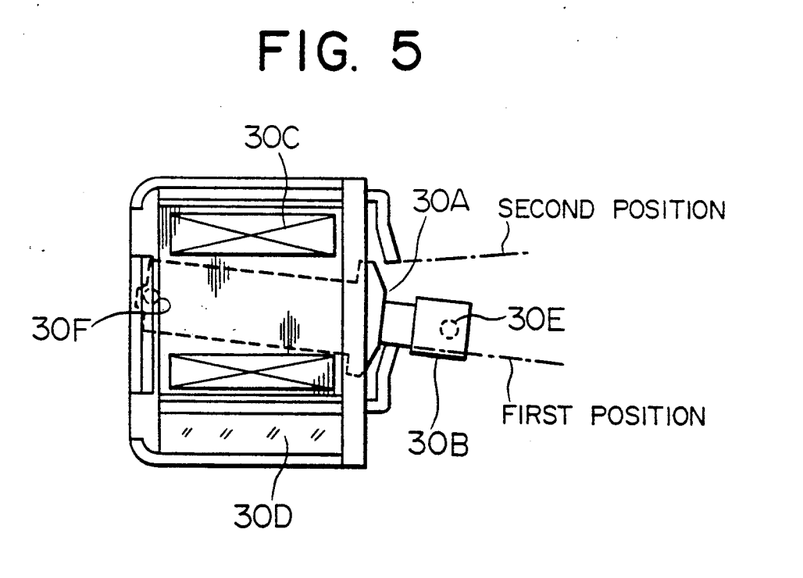
FIG. 5 is a schematic illustration of a monostable solenoid.

In FIG. 5, an example of a monostable high speed control solenoid used as an actuator of this type of shutter, is shown. This solenoid is composed of the permanent magnet 30D, the coil 30C adjacent to the magnet, the movable iron core 30A which is set in a bobbin of the coil 30C being able to oscillate, and the movable member 30B provided to the tip of the movable iron core 30A.

When the coil 30C is not electrified, the movable iron core 30A is placed at the first position, shown in the drawing, being attracted by the permanent magnet 30D. When the coil 30C is electrified, the electromagnetic force generated by the coil, acts in two directions according to the direction of current. One is the same direction as the attraction force of the permanent magnet 30D and the other is the opposite direction to the attraction force of the permanent magnet 30D. In the latter case, when the current exceeds a certain level, drive force exceeding the attraction force of the permanent magnet 30D is generated by the coil 30C. Therefore, the movable member 30B moves counterclockwise, rocking on the shaft 30F which is the fulcrum, and reaches the second position opposite to the first position, wherein the first and second positions are shown in FIG. 5.

When the current supply to the coil 30C is cut off, the moving member 30B is returned to the first position. Hereinafter, the explanation will be limited to the case in which the electromagnetic force generated by the coil 30C, acts only in the opposite direction to the attraction force of the permanent magnet 30D.

Accordingly, when the coil 30C is electrified, the shutter blades can be opened and closed by means of fitting the pin 30E mounted on the movable member 30B to elongated holes of the shutter blades. It can be understood that the exposure time can be controlled by the time period while the coil 30C is electrified.

It is clear that the structure of a camera becomes simpler compared with conventional cameras when a solenoid is used as an actuator of a shutter.

Since the operation of this type of solenoid is reliable and rapid compared with conventional ones, it can be expected that a shutter in which this type of solenoid is used will be activated reliably. It can be also expected that the shutter's opening and closing speed is faster than conventional ones and the shutter efficiency is superior.

Especially when the shutter blades are activated directly by the actuator and the shutter blades are made of synthetic resin, the load on the solenoid becomes very small. As a result, the shutter opening and closing speed becomes still faster.

Recently, many cameras combine the diaphragm with the shutter in order to minimize the body size, reduce the cost, and simplify the mechanism.

When a photograph is taken by a camera with this type of shutter mechanism in the high luminance level in which exposure control is considered to be difficult, in many cases a photographic film is given a prescribed exposure by the following shutter operation; the shutter is partially opened to reach the prescribed aperture size before being fully opened, and then the shutter is shifted to the closing motion to give a photographic film the prescribed exposure.

When a monostable high speed solenoid is applied to the shutter described above, there is a problem; since the shutter opening and closing speed is fast, as mentioned before, the time which is necessary for the shutter to reach the prescribed aperture size is short, and the exposure fluctuates remarkably according to fluctuations of the solenoid electrifying time. This means that the exposure is affected by a fluctuation of the power source and environmental conditions such as a variation in temperature and humidity, which causes a variation of the frictional resistance of the shutter blades.

Accordingly, it is very difficult to accurately control exposure by adjusting the actuator solenoid electrifying time in the case of a shutter in which the monostable high speed control solenoid is used.

In order to solve this problem, the shutter opening and closing speed may be reduced. The mechanical brake method or the mechanical speed control method is generally used to attain this object.

The mechanical method is described as follows. A part of the energy supplied to the actuator is consumed by the above-described methods in order to reduce and stabilize the shutter opening and closing speed.

Another method is disclosed in Japanese Patent Publication Open to Public inspection No. 113130/1986 the details of which are as follows; information about the condition of the opened shutter is detected and fed back in order to establish a relation between the time and the shutter aperture size, and the characteristics of the time and the shutter aperture size are made adjustable.

Since this method is a feedback control, it possesses the advantage of being able to stabilize its efficiency even if disturbed by fluctuations of power source voltage or environmental conditions.

As described above, when a monostable high speed solenoid is used for the actuator of a camera shutter, it is very difficult to obtain exposure accuracy by controlling the actuator electrifying time.

There are methods to solve this problem such as the mechanical brake control method or the mechanical speed control method. However, these methods consume part of the energy to be supplied to the actuator. Therefore, all of the energy necessary to drive the apparatus must be sufficiently large.

On the other hand, the camera has been developed in pursuit of small size and light weight. For that reason, a small actuator has been used for the shutter device and a small power source has been used for the camera; therefore, it is difficult to obtain sufficient energy to activate the shutter device.

As for the mechanical brake control method or the mechanical speed control method, the device for them must be installed in a camera. As a result, a simple shutter device becomes too complicated to apply these mechanical methods to a camera. For these reasons, there are many problems to apply this mechanical speed control method to a camera.

As for the method to make the characteristics of the shutter opening motion adjustable by feeding back the information about the condition of the opened shutter, it is not reliable in view of the response speed of the system, including the feedback system, since the object to control is a high speed phenomenon. Furthermore, the shutter opening condition detecting means and the control means to make the characteristics of the shutter opening motion adjustable, must be installed in a camera. Accordingly, the shutter device becomes complicated and the cost tends to become high.

Sufficiently high accuracy can not be obtained by the shutter device in which a monostable high speed control solenoid is utilized.

The electromagnetic shutter device is characterized in that; the device is simple; energy loss is little; the shutter blades can be activated at a high speed; and sufficiently high exposure accuracy can be obtained. The electromagnetic shutter device for a camera has the structure as follows; when the solenoid is not electrified, the movable iron core of the actuator is held by a spring at a stable first position; when the solenoid is electrified, the movable iron core of the actuator moves to the second position resisting the force of the spring; the movable iron core restricting member is provided which moves between the blocking position and the withdrawn position, wherein the movable iron core restricting member blocks the movable iron core at the blocking position and it does not block the movable iron core at the withdrawn position; the movable iron core restricting member drive means is installed which moves the movable iron core between the blocking position and the withdrawn position, and stops the movable iron core at each position; and the shutter is opened and closed by the above-described actuator.

The plunger type solenoid is widely used as the above-described movable iron core restricting member drive means. The movable iron core of the plunger type solenoid is relatively heavy in the same way as the movable iron core of the monostable solenoid. For that reason, when the camera is subjected to strong vibration or shock such that a photographer drops the camera to the floor or knocks it, the movable iron core restricting member and the moving member of the actuator cause malfunction by their own inertia and interfere with each other. In other words, they are locked and can not move.

Figure 6:
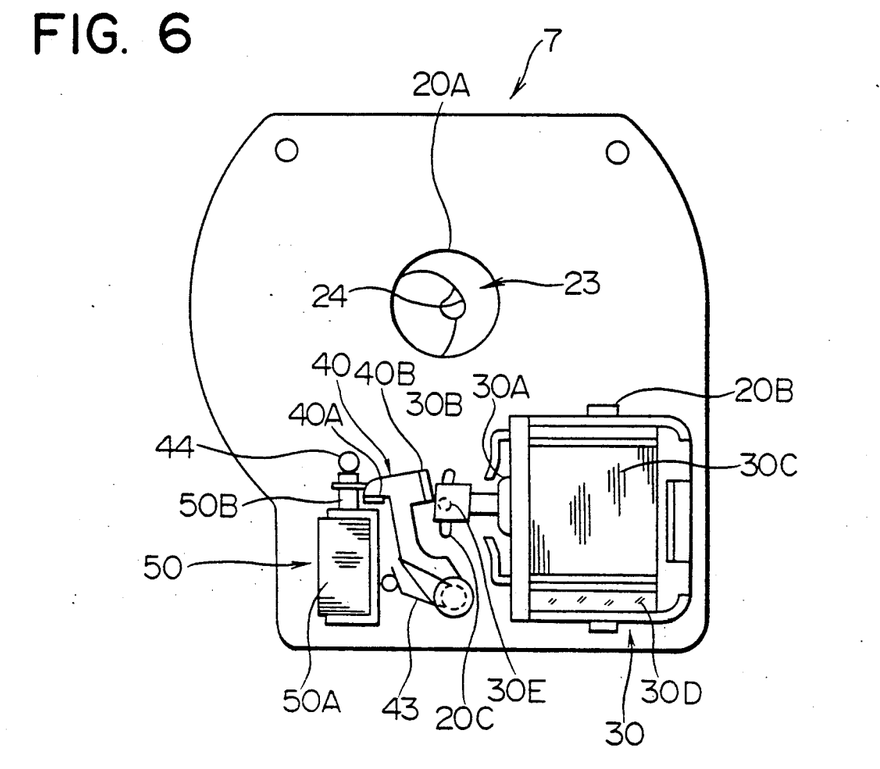
FIG. 6 is a schematic illustration which shows the layout of members of a conventional electromagnetic shutter.

FIG. 6 shows the condition that the actuator is locked. The restricting member 40 follows the movement of the movable iron core 50B of the plunger solenoid 50 by the action of the spring 43. The figure shows the condition when the restricting member 40 follows the movable iron core 50B as the core falls instantaneously with any shock or vibration, and is withdrawn from the locus of the movable iron core 30A; the movable iron core 30A is rotated and the moving member 30B and the restricting member 40 interfere each other; and they are locked with each other being pressed by the spring 43.

This lock condition will continue unless the plunger solenoid 50A is electrified and the movable iron core 50B is attracted and lowered. While the lock condition continues, the shutter blade 23 is opened and the photographic film continues to be exposed.

In the present invention, the arrangement of the plunger solenoid 50 was studied dynamically in order to avoid the above-described trouble caused by shock and vibration given to the camera. One of the objects of the invention is to provide a camera with a electromagnetic shutter in which an actuator such as a monostable high speed control solenoid does not interfere with another electromagnetic drive member such as a plunger solenoid during the operation.

SUMMARY OF THE INVENTION

The object of the present invention is accomplished by a camera with a shutter which is characterized in that; the actuator has a moving member which is held at a stable first position by the action of a spring when the solenoid is not electrified and moves to the second position resisting the force given by the spring when the solenoid is electrified; the restricting member moves between a blocked position where the moving member which is moved by electrifying the actuator is stopped half way, and the withdrawal position where the moving member is not blocked, wherein the restricting member blocks the movement of the moving member, when it is at the block position; the restricting member drive means moves the moving member between the block position and the withdrawal position and stops the moving member at each place; and the shutter is activated by the actuator, wherein the restricting member drive means is arranged so that its activating direction meets approximately at right angles with the locus of the moving member.

Figure 2:
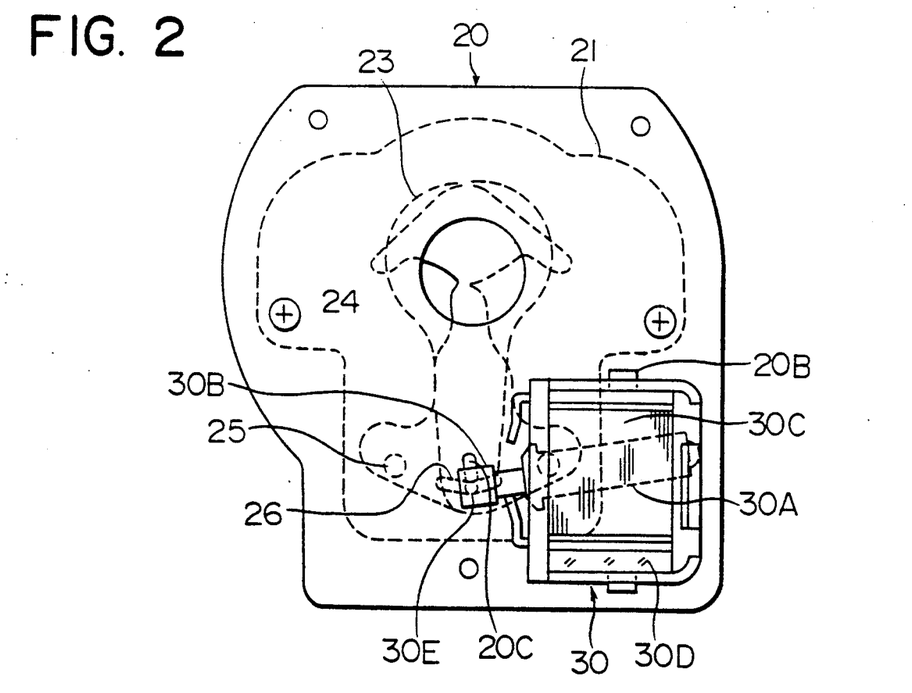
FIG. 2 is a plan view of the shutter device which shows the main portion of the mechanism.
Figure 3:
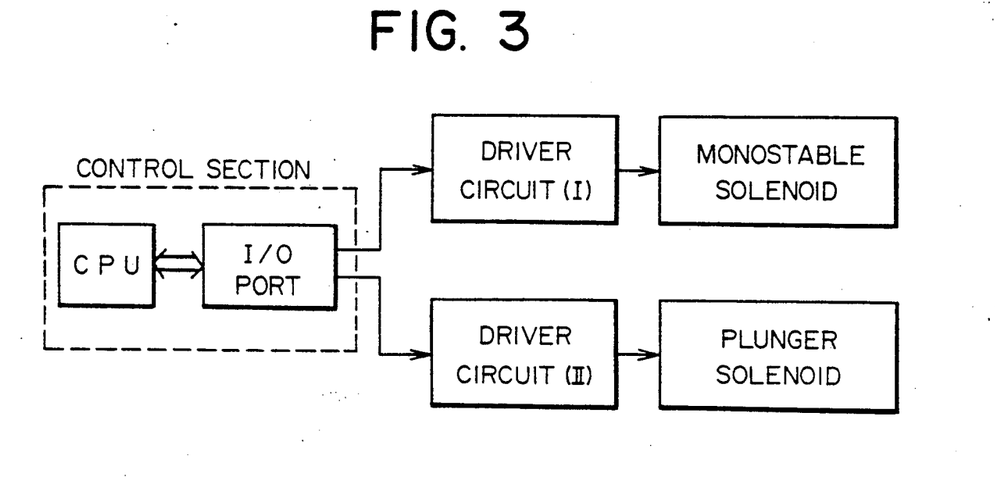
FIG. 3 is a block diagram of the shutter drive system.
Figure 7:
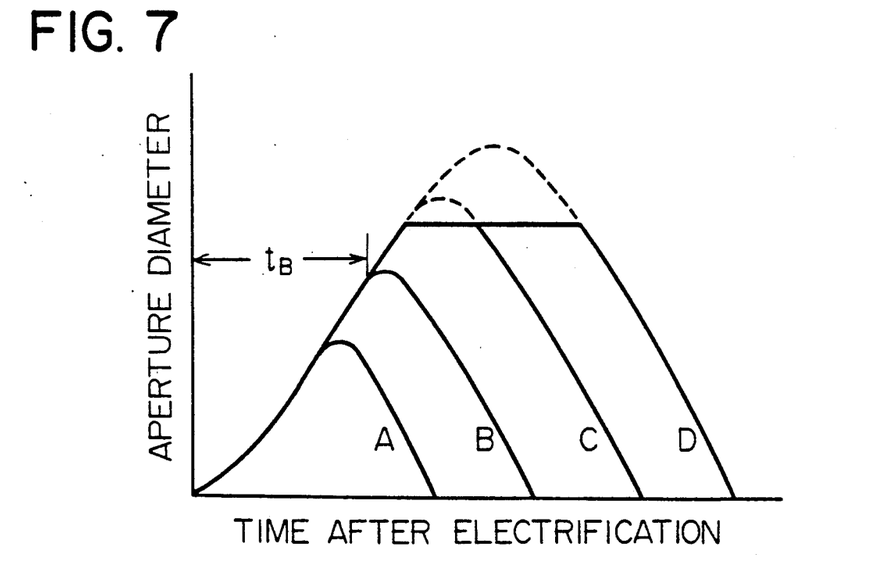
FIG. 7 is a graph which shows the relation between the time after electrification of the actuator and the aperture diameter, wherein the restricting member is not provided with the shutter device.

An explanation will be made about the shutter device of a camera in which a monostable high speed control solenoid is used as the actuator, wherein the above-described restricting member is not provided. FIG. 2 shows the shutter device. FIG. 7 is a graph which shows an example of the shutter aperture characteristics in which the vertical axis indicates the diameter of the aperture and the horizontal axis indicates the time after the actuator was electrified. In the graph, the curves A, B, C, and D are arranged in order of the electrification time to be longer. The letters tB indicate the electrification time corresponding to the curve B.

According to FIG. 7, it can be understood that the exposure amount is varied in accordance with the electrification time. The curve A in FIG. 8 shows the exposure characteristics in which the vertical axis indicates the object luminance and the horizontal axis indicates the electrification time, wherein the object luminance is expressed by EV value.

Figure 8:
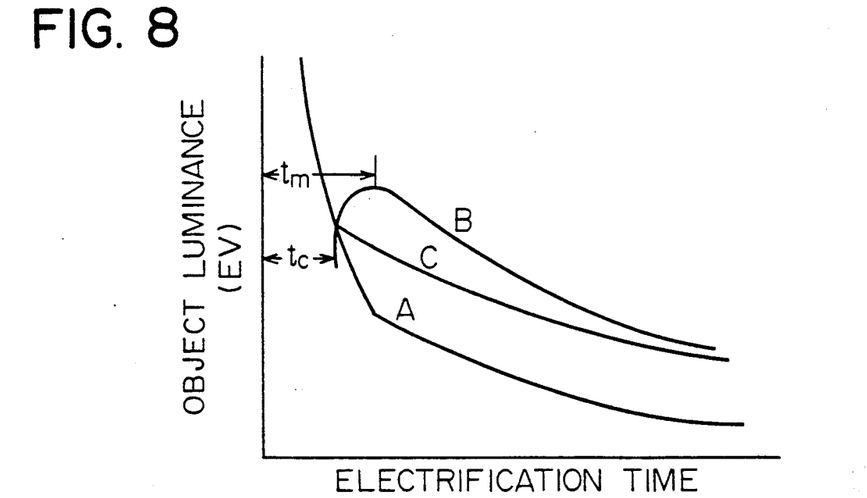
FIG. 8 is a graph which shows the relation between the electrification time of the actuator and the object luminance corresponding to the exposure amount of the shutter device.

The curve A in FIG. 8 shows that when the electrification time is prolonged, the exposure amount is increased in order to take a photograph of an object with low luminance, wherein the gradient of the curve is gentle. On the other hand, the exposure amount varies remarkably in response to the electrification time in the area where the electrification time is short, in order to take a photograph of a high luminance object. On the other hand, the slope of the curve is so steep that it is difficult to make the characteristics regulated when taking a photograph of a high luminance object.

Giving consideration to various photograph taking environments and the fluctuation of power source voltage, this shutter mechanism can not be applied to photographing in the high luminance level.

The following explanation is made in the case of providing the restricting member to the shutter device.

When the electrification time is short, the moving member returns to the first position before it reaches the restricting member. In other words, the moving member is activated in the same way as the shutter device in which the restricting member is not provided. When the electrification time is prolonged and exceeds a certain amount of time, the moving member knocks against the restricting member. At that moment a repulsive force is generated and the moving member is returned to the first position by the force.

Assuming that electrification is cut off at the same moment as the occurrence of the knock, the moving member is returned to the first position due to the action of both the repulsive force caused by the knock and the attractive force by the permanent magnet at a higher speed than the speed at which the moving member is returned to the first position only by the attractive force of the permanent magnet.

When the electrification is cut off just before the moving member reaches the restricting member, the moving member knocks against the restricting member due to inertia of the restricting member and is returned to the first position at a higher speed than the speed at which it is returned only by the attractive force of the permanent magnet.

When the electrification is cut off just after the moving member bumped against the restricting member, a portion of the repulsive force caused by the knock is cancelled by the drive force caused by the coil. However, most of the repulsive force remains active. As a result, the moving member is activated by both the attraction force of the permanent magnet and most of the repulsing force at a higher speed than the speed at which the moving member is returned to the first position only by the attractive force of the permanent magnet.

When the electrification time is further prolonged, the drive force by the coil is activated resisting the repulsive force caused by the knock, the moving member moves again towards the second position and the shutter blades open again.

According to the electrification time, a plurality of knocks occur. However, the effect of the knocks is not so big compared with that described above and is decreased gradually. When the electrification time is further prolonged, the exposure amount is increased. As a result, the effect on the exposure amount caused by the knock against the restricting member becomes small.

Figure 9:
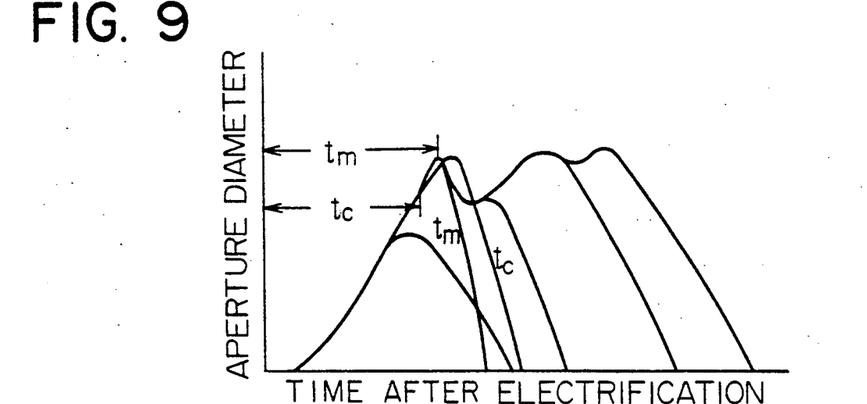
FIG. 9 is a graph which shows the relation between the time after the electrification of the actuator and the aperture diameter of the invention.

FIG. 9 shows the conditions mentioned above. The curve B in FIG. 8 shows the relation between the electrification time and the object luminance.

The letters tc on the curve B in FIG. 8 indicate the minimum electrification time necessary to cause the moving member to knock against the restricting member. When the electrification time exceeds tc, the moving member knocks against the restricting member and the shutter closing time is shortened. Accordingly, the exposure amount begins to decrease.

The shutter blades close most rapidly when the time of repulsion coincides with the time that the electrification of the solenoid is cut off, and the attractive force of the permanent magnet starts working. In this case, the exposure amount by the shutter becomes the minimum under this condition. This electrification time is defined as tm. When the electrification time exceeds tm, the exposure amount is increased again.

When the restricting member is not provided to the shutter device in which the monostable high speed control solenoid is utilized, the object luminance corresponding to the exposure amount is lowered uniformly in accordance with the electrification time as shown by the curve A in FIG. 8. However, when the restricting member is provided to the shutter device, the relation between the object luminance and the electrification time is unique in the area where the electrification time is short and the object luminance is high as shown by the curve B in FIG. 8.

This unique phenomenon is caused by the knock of the moving member against the restricting member. At the time when the knock occurs, the variation of the exposure amount corresponding to the electrification time is small. In other words, it is the time when exposure amount is very stable.

Accordingly, even when a photograph of a high luminance object is taken, a stable exposure amount can be obtained by conducting exposure in the time described above. Needless to say, the shutter device with the restricting member described above, is different from the one which takes a photograph of the object with high luminance by stopping down the diaphragm.

Figure 10:
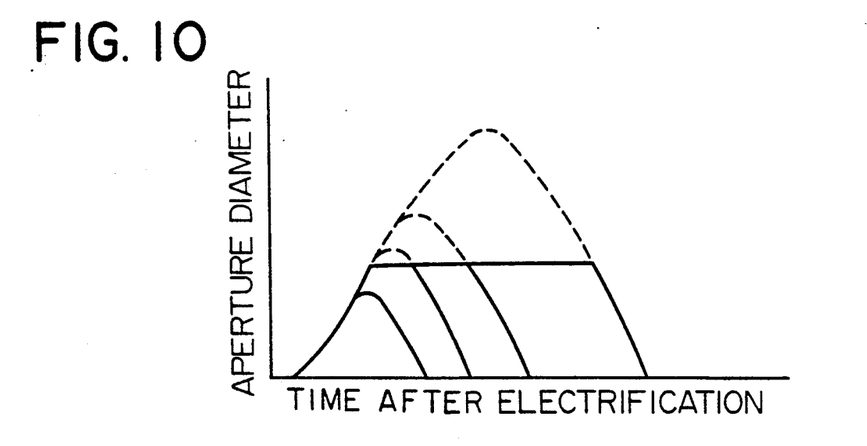
FIG. 10 is a graph which shows the relation between the time after the electrification of the actuator and the aperture diameter of the shutter with an independent diaphragm.

FIG. 10 shows an example of the characteristics of a shutter device in which a diaphragm independent from the shutter is provided instead of a restricting member. The curve C in FIG. 8 shows the relation between the electrification time and the object luminance in that case.

In this shutter device, even when the electrification time is prolonged and the shutter blades are opened wider than the diaphragm at a stop, the widely opened shutter period does not have any effect on the exposure amount. This has an advantageous effect when taking a photograph of an object with high luminance. However, since the shutter blade motion is the same as that shown in FIG. 7, the above-described unique phenomenon in the high luminance area does not occur.

Conventionally, knocking phenomenon among the parts in the shutter device, what is called the rebound phenomenon, has been tried to be eliminated, because this phenomenon makes the aperture characteristics complicated and furthermore makes the exposure accuracy lower. However, in the present invention, highly accurate exposure can be obtained by positively making use of the rebound phenomenon which occurs between the moving member and the restricting member of the shutter device.

In the shutter device of the present invention, the locus of the moving member of the actuator to open and close the shutter, makes almost a right angle with the activating direction of the restricting member drive means.

When the direction of shock or vibration given to the camera coincides with the activating direction of the restricting member drive means, or the direction makes a right angle with it, the inertia effect is caused only on either the restricting member of the restricting member drive means or the above mentioned moving member. Accordingly, malfunction never occurs to both members at the same time. Therefore, the above-described lock of members which is fatal to the shutter function, can be avoided.

DETAILED DESCRIPTION OF THE INVENTION

Figure 1:
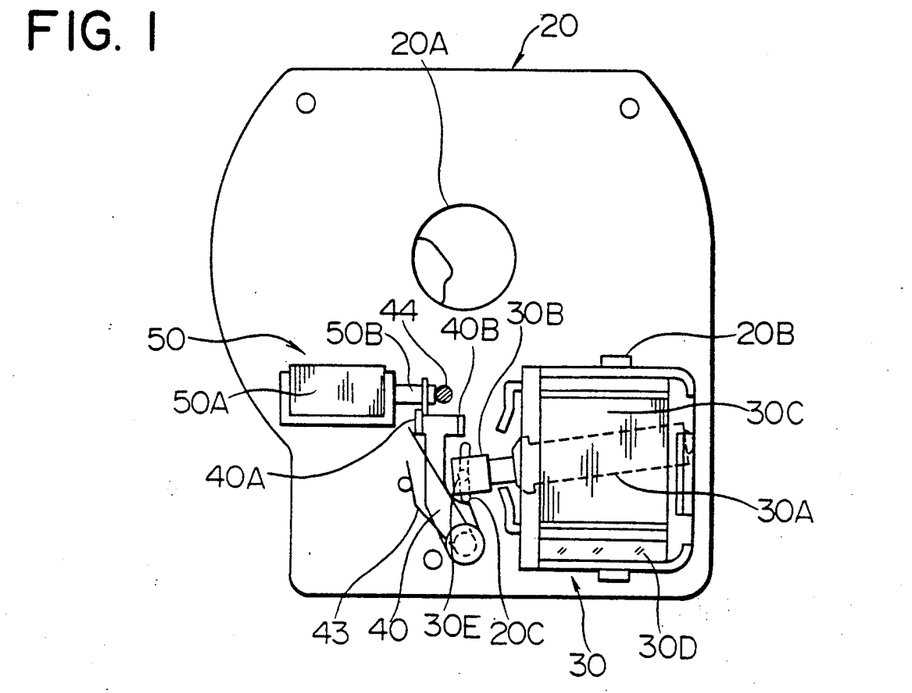
FIG. 1 is a schematic illustration of the shutter device of a camera of the present invention.

Referring now in detail to the drawings, the shutter device of the invention will be explained as follows. One of examples of the invention is shown in FIG. 1, FIG. 2, FIG. 3, and FIG. 4. In FIG. 1, the shutter blades and the shutter blade holding plate are omitted. These members are shown in FIG. 2. FIG. 1 shows two electromagnetic drive members which are attached to the outside of the shutter device of a camera of the invention. The numeral 20 is a bottom train plate of the shutter. The numeral 20A is an aperture for the photographing optical path. The numeral 30 is a monostable high speed control solenoid which is the actuator to drive the shutter blades. The monostable high speed control solenoid 30 is resiliently fixed to the shutter bottom train plate 20 through a pair of hook members 20B which protrude from the bottom train plate 20.

The numeral 30C which is built in the monostable high speed control solenoid 30, is a coil to obtain a drive force by electrification. The numeral 30A is a movable iron core which is supported by a bearing so that it can be oscillated in the bobbin of the coil 30C. The numeral 30B is a moving member which is mounted at the tip of the movable iron core 30A. The numeral 30D is a permanent magnet which attracts or repulses the movable iron core 30A. The numeral 40 is a restricting member which blocks the movement of the moving member 30B halfway. The restricting member 40 has the function to block the movement of the moving member 30B halfway which moves from the first position shown in the drawing to the second position by electrifying the coil 30C.

The restricting member 40 is supported by a shaft which is fixed to the bottom train plate 20 and always pressed clockwise by the return spring 43. The pressed restricting member 40 transmits the force to the movable iron core 50B of the plunger solenoid 50 of the actuator to activate the restricting member. The pressed moving member is checked by the stopping device 44.

Both of numerals 40A and 40B are the folded portions which are protruded from the restricting member 40. The folded portion 40A engages with the movable iron core 50B to transmit the above-described force. The folded portion 40B is the object to knock when the movement of the moving member 30B is restricted by the restriction member 40. In FIG. 2, the numeral 23 is a pair of symmetrical shutter blades which are installed in the slit-shaped space which is formed between the shutter blade holding plate 21 screwed to the shutter bottom train plate 20. The numeral 24 is a curved member which determines the rotative angle of the shutter blades 23. As a result, the aperture area of the shutter is determined. The shutter blades 23 have the shaft 25 which is fitted to a hole in the shutter bottom train plate 20, and the shutter blades 23 are rotated around on the shaft 25. The shutter blades 23 also have the elongated holes 26 in to which the pin 30E is fitted. The pin 30E is mounted on the moving member 30B. The elongated hole 20C is provided to the shutter bottom train plate 20 so that the pin 30E mounted on the moving member 30B can move when the movable iron core 30A is oscillated.

Electrification of the plunger solenoid 50 is controlled by the control section. When the plunger solenoid is not electrified, the movable iron core 50B is protruded in the right direction shown in FIG. 1 and stopped by the stopping device 44 at a position where it protrudes, in order to hold the restricting member 40 at the position which is shown in the drawing.

When the plunger solenoid 50 is electrified, the movable iron core 50B is attracted and moved in the left direction, and the restricting member 40 withdraws from the locus of the moving member 30B; therefore, the moving member 30B is structured not to knock against the folded portion 40B when the movable iron core 30A is oscillated.

When the coil 30C of the monostable high speed control solenoid 30 is not electrified by the control section, in other words, when exposure has not been conducted yet, the moving member 30A is held at the stable first position by the attractive force of the permanent magnet 30D and the shutter blades are held at the closed position.

In the normal photograph taking operation, the plunger solenoid 50 is not electrified by the control section, and the restricting member 40 is set at the position shown in FIG. 1. When the coil 30C is electrified and the moving member 30B is about to be moved, the moving member 30B knocks against the folded portion 41 of the restricting member 40, and the movement of the moving member 30B to the second position is blocked.

Then, the unique phenomenon shown by the curve B in FIG. 8 occurs, and the exposure characteristics which are advantageous in the high object luminance region, can be obtained. The result is that an adequate exposure is obtained by setting the electrification time of the coil 30C. When taking a photograph of an object with low luminance, the electrification time may be prolonged in accordance with the low luminance object. However, camera-shake by the photographer tends to occur when the exposure time is prolonged. It is preferable to make the time of exposure short when taking a photograph to avoid an undesirable effect caused by camera-shake.

In that case, the plunger solenoid 50 is electrified by the signal sent from the control section to attract the movable iron core in the left direction in FIG. 1. Then, the restricting member 40 is rotated counterclockwise resisting the force of the return spring 43, and the folded portion 40B of the restricting member 40 is withdrawn from the locus of the moving member 30B. After that, the coil 30C of the monostable high speed control solenoid 30 is electrified to make the moving member 30B move from the first position to the second position. Then, the pin 30E is rotated to drive the shutter blades 23 until they are fully opened for exposure, while the aperture 20A functions as a diaphragm. When the electrification is stopped, the moving member 30B is returned to the first position by the attraction of the permanent magnet 30D. Exposure is conducted in this way.

Accordingly, when the movement of the moving member 30B is not restricted by the restricting member 40, the shutter blades are fully opened. For that reason, a short electrification time is available to obtain the same exposure amount.

The shutter provided to a camera of the present invention is the electromagnetic shutter which is driven by the monostable high speed control solenoid 30 and the plunger solenoid 50. When the photometry information and the photographic film sensitivity information is inputted into the control section shown in FIG. 3, the control section processes the information. When release operation is conducted, the shutter blades are driven through the driver circuit [I] or the driver circuit [II] according to the result of the above-described data processing. In the present invention, the operational direction of the movable iron core 50B of the plunger solenoid 50 and the locus of the movable iron core 30A of the monostable solenoid 30 intersect at right angles or at approximately right angles.

Accordingly, when the direction of shock or vibration given to the camera coincides with the operational direction of the movable iron core 50B, or makes a right angle with it, inertia acts either on the movable iron core 50B or on the movable iron core 30A. Therefore, there is no case in which both of the cores are in malfunction at the same time. In this case, locking of the two members caused by interference can be eliminated, which has occurred in the conventional type of apparatus.

Figure 4:
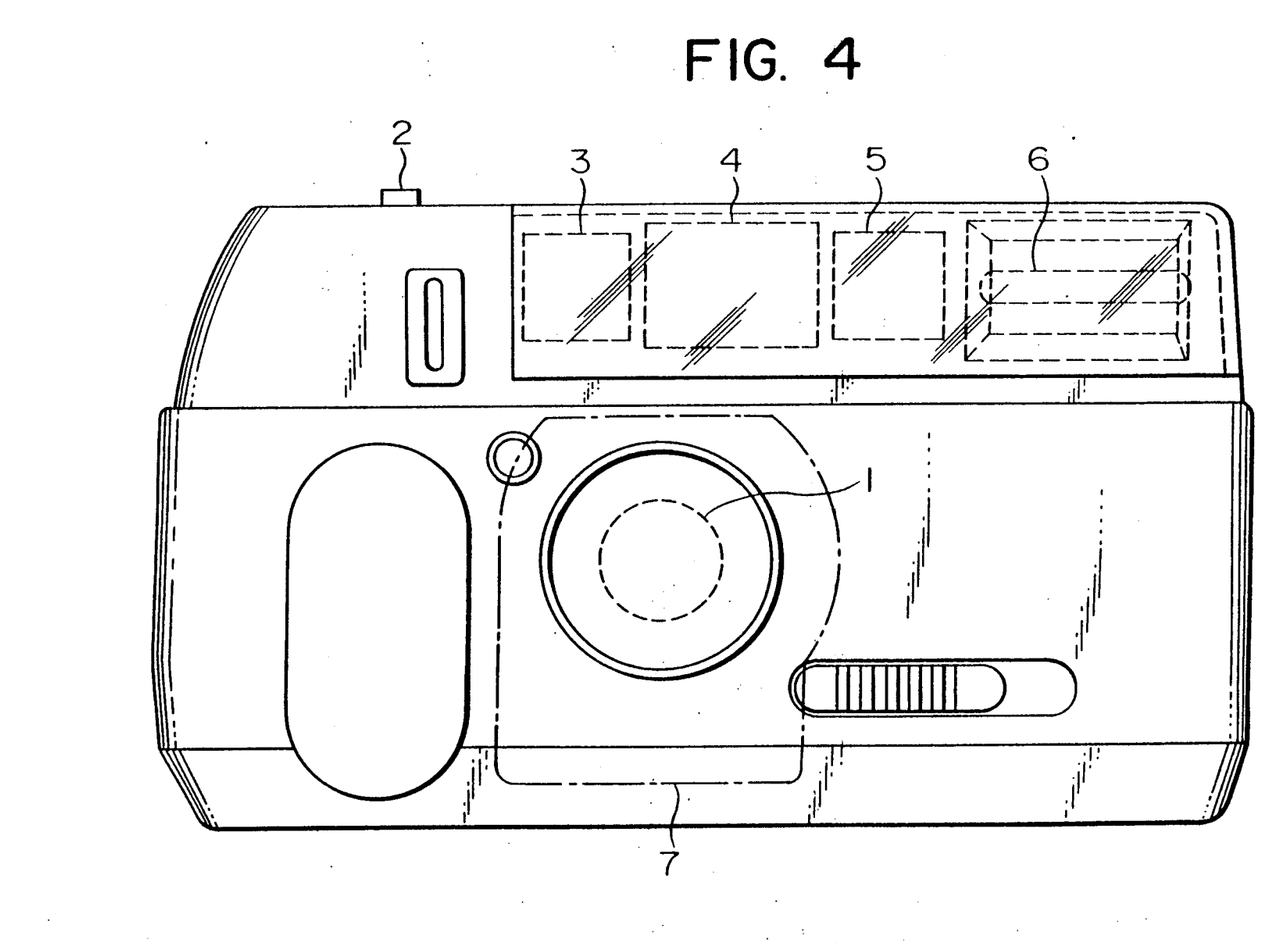
FIG. 4 is an elevational view of the camera.

FIG. 4 is a front view of the camera of the present invention; the position and direction of the shutter device 7 is illustrated by dotted lines. Since the direction of vibration or shock given to a camera is usually vertical or horizontal, it is preferable that the two electromagnetic drive members are laid out as shown in FIG. 1. Lock of the two members can be almost completely avoided, accordingly.

In the example described above, when the electromagnetic drive device of the restricting member 40, which is the plunger solenoid 50, is not electrified, the restricting member 40 is within the locus of the moving member 30B and blocks the movement of the moving member 30B. This is intended to economize the power source battery giving consideration to the fact that a high luminance object is more frequently photographed than a low luminance object in general photographing. On the other hand, the following structure of the shutter device may be also available: when the electromagnetic drive device of the restricting member 40 is not electrified, the restricting member 40 is withdrawn from the locus of the moving member 30B so that the restricting member can not interfere with the movement of the moving member 30B. In the former structure of the shutter device, the plunger solenoid 50 is electrified to withdraw the restricting member 40 from the locus of the moving member 30B, and the monostable high speed control solenoid 30 is electrified to open the shutter blades close to the maximum aperture size. If an accident happens in the camera at this moment, such as the battery coming out from the camera or shutting off of the power line, the following problem may occur: since the electrification of the plunger solenoid 50 is cut off, the restricting member 40 moves into the locus of the moving member 30B; since the electrification of the monostable high speed control solenoid 30 is cut off, the moving member 30B is moved to the first position by the action of the permanent magnet 30D; as a result, the moving member 30B comes into contact with the folded portion 40B of the restricting member 40 from the opposite side and there is a possibility that the shutter is left open. However, in the latter structure of the shutter device, when the electrification is cut off, the restricting member 40 is withdrawn from the locus of the moving member 30B without fail. Therefore, the problem described above can be prevented.

According to the present invention, a camera can be provided which is equipped with a reliable electromagnetic drive shutter device, wherein the exposure accuracy of the shutter device is high and the shutter device can sufficiently resist shock and vibration given to the camera.

What is claimed is:
1. A camera, comprising:
a shutter means for controlling a light amount from outside of said camera to a photosensitive material therein,
a first driving means for actuating said shutter means,
wherein a driving movement means moves between first position and second position so that said shutter means is driven,
a restriction means for obstructing the movement of said driving movement means,
wherein said restriction means moves between first location, where said restriction means restricts the movement of said driving movement means on the way of the movement, and second location, where said restriction means allows the whole movement of said driving movement means, and
a second driving means for actuating said restriction means,
wherein said restriction means is disposed so that said second driving means moves in a direction orthogonal to the moving direction of said driving movement means.

* * * * *